(12) United States Patent
Horesh et al.

(10) Patent No.: US 11,410,210 B2
(45) Date of Patent: Aug. 9, 2022

(54) SYSTEM AND METHOD FOR PREDICTING PERSONALIZED PAYMENT SCREEN ARCHITECTURE

(71) Applicant: Intuit Inc., Mountain View, CA (US)

(72) Inventors: Yair Horesh, Tel Aviv (IL); Yehezkel Shraga Resheff, Tel Aviv (IL); Daniel Ben David, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 388 days.

(21) Appl. No.: 16/789,476

(22) Filed: Feb. 13, 2020

(65) Prior Publication Data

US 2021/0256579 A1    Aug. 19, 2021

(51) Int. Cl.
*G06Q 30/04* (2012.01)
*G06N 7/00* (2006.01)
*G06N 20/20* (2019.01)
*G06N 5/00* (2006.01)
*H04L 67/02* (2022.01)

(52) U.S. Cl.
CPC .............. *G06Q 30/04* (2013.01); *G06N 5/003* (2013.01); *G06N 7/005* (2013.01); *G06N 20/20* (2019.01); *H04L 67/02* (2013.01)

(58) Field of Classification Search
CPC ........ G06Q 30/04; G06N 5/003; G06N 7/005; G06N 20/20; G06N 3/006; H04L 67/02
See application file for complete search history.

(56) References Cited

U.S. PATENT DOCUMENTS

| 2019/0073669 | A1* | 3/2019 | Dutta | G06Q 20/405 |
| 2019/0147430 | A1* | 5/2019 | Chen | G06K 9/6259 |
| | | | | 705/40 |
| 2020/0065833 | A1* | 2/2020 | Cantley | G06Q 30/04 |
| 2020/0211065 | A1* | 7/2020 | Govindarajalu | G06Q 20/085 |
| 2022/0020049 | A1* | 1/2022 | Rao | G06Q 20/102 |

* cited by examiner

*Primary Examiner* — Shirley X Zhang
(74) *Attorney, Agent, or Firm* — DLA Piper LLP (US)

(57) ABSTRACT

A computer-implemented method and system are provided to utilize machine learning technology to process user financial transaction data to predict a personalized payment screen architecture. A plurality of feature datasets associated with transaction data of a plurality of electronic invoices are obtained by a computing device. Each feature dataset comprises a plurality of features, a payment screen and a payment method configured to be presented on at least one payment screen. The computing device is configured to train a machine learning model with the feature datasets to produce a probability matrix with probabilities of each payment method used to pay the invoices through each payment screen. The computing device may weigh the probability matrix to generate a recommendation matrix and determine a prediction of a payment screen based on the recommendation matrix.

20 Claims, 12 Drawing Sheets

| Transaction Feature Dataset 200 |||
|---|---|---|
| Main Features 210 | Feature Categories | Features |
| | Payee Entity/Merchant Features 212 | State |
| | | Industry |
| | | Invoice payment history |
| | Invoice Features 214 | Amount |
| | | Service/Purchase Time |
| | | Date based features (e.g., when an invoice is created, sent, viewed, and paid). |
| | Payer Entity Features 216 | Payment History |
| | | Device & Location |
| | Payment Screen(s) 218 | One of a plurality of payment screens (Graphical User Interfaces) |
| Target 220 Variable (Feature) | Payment method(s) 222 | One or more payment method used to make a payment via a payment screen |

FIG. 2A

| Features | Description |
|---|---|
| Viewed_day | Day in week |
| Payment_method_indicate_company_count | Number of times that the most frequent payment method used for a merchant |
| Payment_method_indicate_company_mode | Most frequent payment method for a merchant |
| Payment_method_indicate_payor_mode | Most frequent payment method used by a payor or payer |
| Payment_method_indicate_payor_count | Number of times that the most frequent payment method used by a payor or payer |
| Above_dbc | Order of one of the payment screens |
| Above_dcb | Order of the other payment screen |
| TX | Merchant State in the U.S. |
| Others | Not frequent Merchant State in the U.S. |
| CA | Merchant State in the U.S. |
| Missing_Value | Merchant Unknown Industry |
| FL | Merchant State in the U.S. |
| Sent 20_32 | The range of days in the month an invoice was sent |
| Sent 5_!5 | The range of days in the month an invoice was sent |
| Professional scientific and technical services | Merchant Industry |
| Other services | Merchant Industry |
| Sent 15_20 | The range of days in the month an invoice was sent |
| Viewed 20_32 | The range of days in the month an invoice was viewed |
| Viewed 5_10 | The range of days in the month an invoice was viewed |

FIG. 8B

SYSTEM AND METHOD FOR PREDICTING PERSONALIZED PAYMENT SCREEN ARCHITECTURE

The present disclosure relates to a machine learning system to process financial transaction data for predicting personalized payment screen architecture.

BRIEF DESCRIPTION OF THE DRAWINGS

FIG. 2A illustrates an example transaction feature dataset structure in accordance with some embodiments of the present disclosure.

FIG. 8B illustrates a list of example transaction features used for the machine learning model training in accordance with some embodiments of the present disclosure.

DETAILED DESCRIPTION

Figure 1:
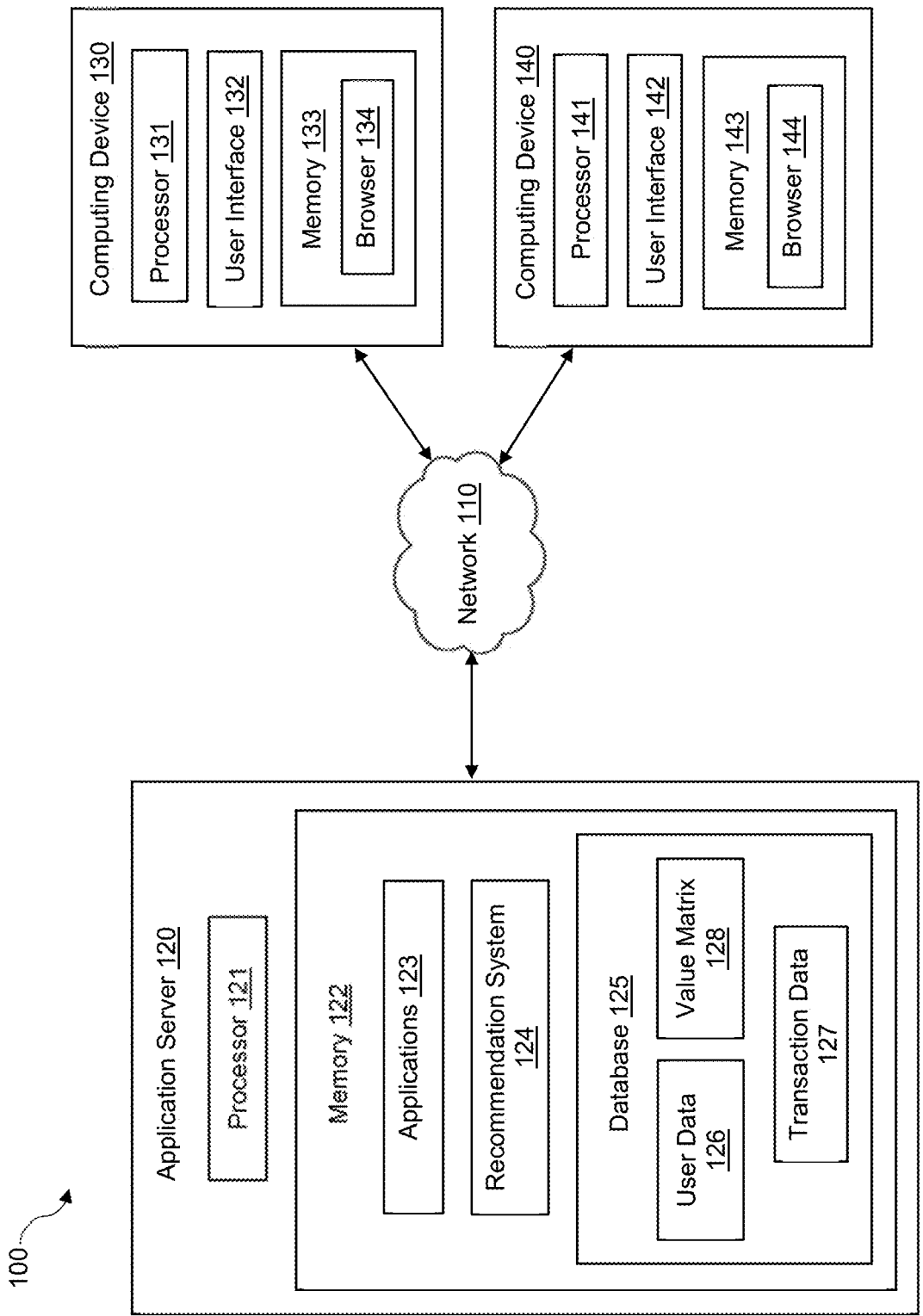
FIG. 1 illustrates a hardware structure of an example computing system in accordance with some embodiments of the present disclosure.

Embodiments of the present disclosure describe techniques of implementing and building a machine learning recommendation system to process user financial transaction data and provide predictions of personalizing payment screen architecture and related payment methods.

Merchants (e.g., payees) may subscribe to a financial service or software product for generating and sending invoices to their customers (e.g., payers), and further receiving corresponding payments from their customers. The financial service may include QuickBooks®, QuickBooks Self-Employed®, and QuickBooks Online® (QBO) by Intuit® of Mountain View Calif. For example, a merchant may use a financial service provider's financial management platform (e.g., Intuit QuickBooks Counterpart Portal) to generate invoices and send the invoices to their customers via emails. Each invoice may include a selectable user interface component that, when selected by the customer, opens a link to a payment screen via the service provider's financial platform. By activating the invoice payment link, a payer may access the payment screen, which is then presented on their client device. The payer can then make a payment to the invoice via the payment screen.

In this context, the financial service provider may prefer some payment methods over others. For example, the financial service provider may generate revenue by receiving interchange rates or transaction fees when a merchant's invoices are paid via the financial management platform. The financial management platform generally provides payment screens that payers could utilize to review and pay their invoices. However, payers often choose to pay via other invoice payment mechanisms outside the platform instead. As a result, the merchants may not be able manage their invoices and payer payments efficiently and correctly and the revenue received by the financial service provider may be decreased.

To increase the rate at which payers use the financial management platform to pay invoices, the service provider may provide payment screens that are personalized to payers based on their preferences. Delivering a personalized payment screen architecture may increase payment transfer fees earned through the service provider's platform and enable merchants to integrate the generated invoices with corresponding payer payments efficiently and correctly through the financial management platform.

To address these issues, the present disclosure may utilize machine learning technology to analyze complex transaction data to predict and present a personalized payment screen with user preferred payment methods for an individual payer in response to generating an invoice to a payer. The present disclosure provides a machine learning recommendation system that may generate a user payment screen prediction with ordered methods of payment for an individual payer user. The machine learning recommendation system may be implemented by building a payment method personalization model for processing user transaction features to fit different payment screens in a personalized way to maximize payer payments and payment ratio via the financial managing platform.

Dynamic payment methods can reveal insights about observed user payment behaviors and behavior patterns that similar users may exert when they interact with different payment screens. For example, an insight about user payment behaviors may be used to predict most possible actions in a future period for the users. The present disclosure may use a supervised machine learning model called a gradient boosting decision tree (GBDT) model to process invoice related transaction features and analyze user payment decision making behaviors for generating a prediction of a payment screen based on probabilities of payment methods. In some embodiments, historical transaction data may be used to construct and generate a plurality of data features. The plurality of data features may be classified by the trained machine learning model to predict payment method probabilities with different payment screens and to further predict a personalized payment screen for each invoice. A personalized payment screen is represented as a graphical user interface for a payer to make the corresponding payment. The personalized payment screen may include different layouts and orders of various payment methods. The personalized payment screen may be a portal page presented as a graphical user interface with personalized payment methods presented in a particular order and/or layout.

The embodiments of present disclosure address a computer-centric and Internet-centric problem of a product service to predict customized payment screens with ordered payment methods for electronic transaction invoices. The machine learning system may be implemented as computer programs or application software executed to process payment related data by a computing system operated in a server-client computing environment, which establishes a practical machine learning based application to predict customized payment screens for maximizing payments via the financial management platform, thereby increasing the service provider's revenue.

As used herein, the term "merchants," "payee user," or "payee entity" may include, but are not limited to, payees who subscribe to a service product for sending electronic invoices associated with electronic financial transactions to payer entities.

As used herein, the term "payer users", or "payer entity" may include, but are not limited to, merchants' customers who receive and pay the electronic invoices associated with electronic financial transactions with one or more merchants through invoice portal pages provided by the financial management platform.

As used herein, the term "payment" to an "invoice" may include any payment owed by a payer entity to a payee entity.

As used herein, the term "financial management platform," or "service product" may include, but not limited to, an online cloud product service, a standalone software application, and a mobile application installed on a computing device, etc.

In addition, as used herein, the term "financial transaction data" may include data associated with any financial transaction conducted by, or on behalf of, a payer of a financial management and invoice payment system. Consequently, as used herein, the term "financial transaction data" may include invoice related financial transaction data, but is not limited to invoice related financial transaction data. Indeed, such data may include any other payment data representing payment due items to be paid through the personal financial management and invoice payment system.

FIG. 1 illustrates an example computing system 100 configured to analyze financial transaction data to produce payment method probabilities and generate payment screen predictions. As illustrated, system 100 may include an application server 120 (e.g., a server computing device), one or more computing devices 130 (e.g., computing devices each operated by a payee entity), and one or more computing devices 140 (e.g., computing devices each operated by a payer entity). Application server 120 may include a processor 121, a memory 122 and a communication interface for enabling communication between different computing devices over network 110. Application server 120 may be in communication with a plurality of computing devices 130 operated by payee entities and computing devices 140 operated by payer entities within a cloud-based or hosted environment via a network 110. For example, communication between the computing devices may be facilitated by one or more application programming interfaces (APIs). APIs of system 100 may be proprietary and/or may be examples available to those of ordinary skill in the art such as Amazon® Web Services (AWS) APIs or the like. Network 110 may be the Internet or other public or private networks or combinations thereof.

Application server 120 may include one or more online applications 123, a recommendation system 124, a database 125, and other program modules which are implemented in the context of computer-executable instructions and executed by application server 120. The one or more online applications 123 may be executed by processor 121 for providing one or more computer-hosted services and/or providing websites with particular services for a user to visit via a browser running on a computing device. For example, application server may host a financial service provider's financial management platform (e.g., QuickBooks™ online application) to provide an online information service via a web application that may be accessed by the computing device 130 operated by a payee entity via a browser application 134. The information service may be any network 110 accessible service that implements an accounting and or financial management service. In one or more embodiments, specific examples of software products or services include, but are not limited to QuickBooks™ software products or services available from Intuit, Inc. and/or various other software systems known to those of skill in the art and/or as developed in the future.

The recommendation system 124 may be integrated into one of the components of the applications 123 and configured to analyze financial transaction data and generate personalized payment screens with a list of predicted payment methods for electronic invoices associated with financial activities between payee entities and corresponding payer entities.

The payee entity may be a merchant who creates an account and subscribes to one or more online software products or services provided by application server 120 or hosted on application server 120 in an online cloud computing environment. The merchants may access the subscribed service application(s) or the financial management platform provided by or run on application server 120 to perform particular financial management activities using browser applications 134 through computing devices 130 associated with payee entities. Each payee user account information may be stored as user data 126 in database 125. User data 126 associated with a particular payee entity may include user name, user identifier (ID), email address, phone number, payment account information, and any other user information. Within the financial management platform, a payee may create electronic invoices based on transaction data, send the invoices to payers, apply payments to payee accounts, and perform other business transactions. A record of each transaction may be associated with payee user account and stored in database 125. A single payee entity may have multiple computing devices 130, and/or there may be multiple payees each having their own computing device (s) 130.

The payer entity may be an entity who is responsible to pay the invoice associated with one or more services provided by a payee entity. Computing device 140 associated with a payer entity may include a processor 141, a user interface 142, a memory 143, and a browser application 144. Browser application 144 may facilitate payer user interaction with application server 120 and may be configured to transmit information to and receive information from application server 120 via network 110. For example, computing device 140 may be equipped with browser application 144, which may be used to provide a convenient interface to allow a payer user to submit a payment to an invoice to an online application product running in application server 120 over network 110.

Computing devices 130 operated by a payee entity and computing devices 140 operated by a payer entity may be any device configured to present user interfaces and receive inputs thereto. Each computing device 130 or 140 may be a smartphone, a personal computer, a tablet, a laptop computer, a personal digital assistant (PDA), or any computing system.

As illustrated in FIG. 1, application server 120 is depicted as a single device for ease of illustration, but those of ordinary skill in the art will appreciate that application server 120 may be embodied in different forms for different implementations. For example, application server 120 may include a plurality of servers communicating with each other through network 110. Alternatively, the operations performed by application server 120 may be performed on a single server.

Database 125 may be coupled to or in communication with the application server 120 via network 110. Database 125 may store user data 126, historical financial transaction data 127, a value matrix 128, and other data. Database 125 may receive instructions or data from and send data to application server 120. In some embodiments, the database 125 may be a shared remote database, a cloud database, or an on-site central database. In some embodiments, application server 120 may retrieve and aggregate financial transaction data 127 by accessing a particular financial server or database via network 110. In one embodiment, application server 120 may store the retrieved financial transaction data 127 in database 125. Financial transaction data 127 may include a plurality of transaction features (e.g., attributes) representing transaction behaviors and payment history while the payees and payers interact with application server 120 regarding products or online services through computing devices 130 and 140. Financial transaction data 127 may be used for recommendation system to predict personalized payment screens for invoice requests from payee entities. Financial transaction data 127 associated with a plurality of invoices and payments may be acquired by a data management system in communication with the application server 120.

Figure 2B:
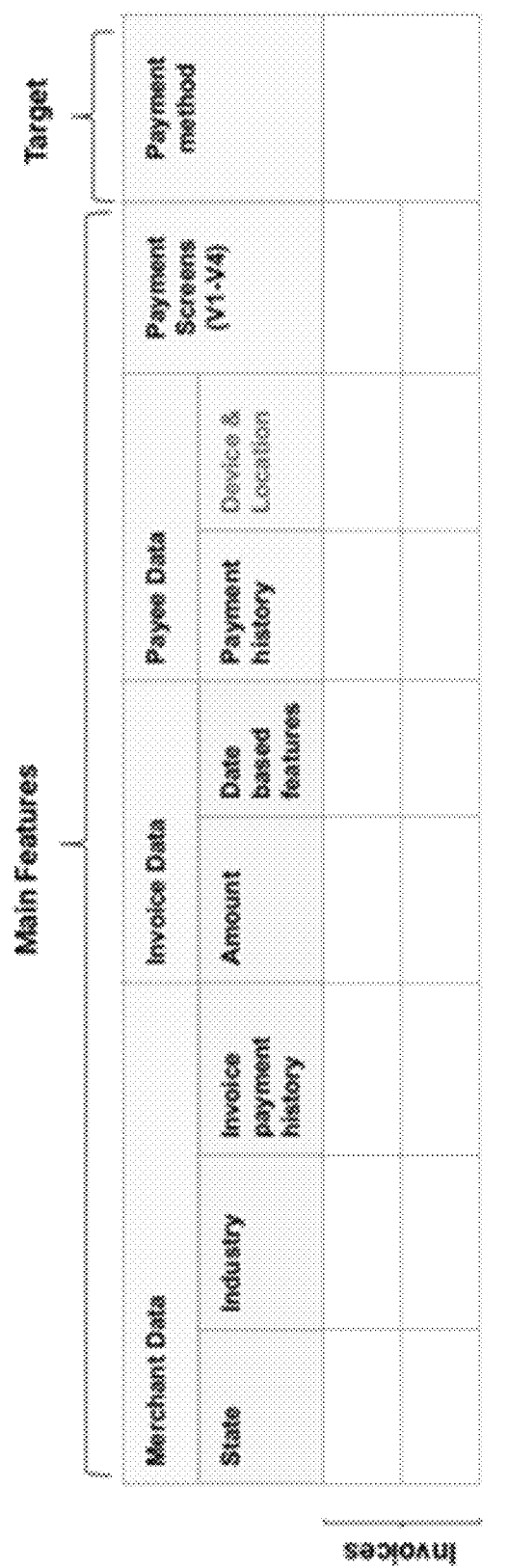
FIG. 2B illustrates an example transaction feature dataset in accordance with some embodiments of the present disclosure.

FIG. 2A illustrates an example transaction feature dataset structure in accordance with some embodiments of the present disclosure. FIG. 2B illustrates an example transaction feature dataset which may be maintained in one or more tables or data matrices stored in database 125 in accordance with some embodiments of the present disclosure. The recommendation system 124 of application server 120 may include a data preprocessing model to construct and generate a plurality of transaction feature datasets 200 associated with a plurality of transactions between the payees and payers based on respective transaction data 127. Each transaction feature dataset 200 may be extracted from transaction data 127. Each transaction feature dataset 200 may include payment behaviors to represent how a payer interacts with a portal page of payment screen to choose a payment method. Each transaction feature dataset 200 associated with an electronic financial transaction between a payer and a payee may include a plurality of features (e.g., attributes), one or more payment methods, and an indication of a payment screen while a payer may interact with application server 120 to make a corresponding payment via an online product or service (e.g., QuickBooks™ products or services) through a computing device 140 via network 110. Each transaction feature dataset 200 may include a plurality of feature categories to represent the related invoice and payer payment behavior information.

As illustrated in FIG. 2A, each transaction feature dataset 200 may include a plurality of main features 210 and a target variable 220 (e.g., target feature). Main features 210 may include payee entity features 212 (e.g., merchant features), invoice features 214, payer entity features 216, and or payment screen(s) 218. Each feature of the transaction feature dataset 200 may be indicated or normalized as a particular value. Each feature category may include one or more features. For example, payee entity features 212 may include a set of features, such as "State," "Industry," "Invoice payment history," etc. Invoice features 214 may include a set of features, such as "Amount," "Service/purchase Time," "Date based features," etc. The "Date based features" may include time-stamped features associated with an invoice, such as a sent date, viewed date, due date, and paid date. Payer entity features 216 may include a set of features, such as "Payment history," and "Device & Location," etc. The "Payment history" feature of the payer entity features 216 may include the most frequent payment method used by a payer and a number of times of the most frequent payment method used by the payer during a certain period of time. Payment screen 218 may be one of a plurality of different choice architecture payment screens. Each payment screen 218 may be a predetermined payment screen template provided by the platform. Each payment screen template may include a list of ordered payment methods, such as "Debit Card," "Credit Card," "ACH," "PayPal," and "Apple pay", etc.

Application server 120 may execute the recommendation system 124 to predict a personalized payment screen from a plurality of choice architecture payment screens. For example, FIG. 2B shows a transaction dataset that may include a payment screen from 4 types of choice architecture payment screens V1-V4. Each choice architecture payment screen may include a set of ordered default payment methods presented to a payer user on a user interface of a payer computing device 140. For example, each choice architecture payment screen may include different default payment methods arranged on the payment screen in a particular order. For example, multiple default payment methods may be ordered and presented on a payment screen in a vertical direction or a horizontal direction.

The financial management platform may provide all types of default payment methods, such as "Debit card," "Credit card," "Bank transfer," "Automated Clearing House (ACH) network," "PayPal/Apple Pay," and "Apple pay", etc. A payer may choose one of a plurality of default payment methods presented on a payment screen to make payment to an invoice generated by the financial management platform. Payment method 222 may be a target feature associated with a payment screen and user action of selecting one payment method from a payment screen to pay the related invoice.

FIG. 3A-3D are example choice architecture screenshots of user payment screens associated with a particular financial transaction displayed on a user interface of a computing device in accordance with some embodiments of the present disclosure. The choice architecture screens may include choices and an order of default payment methods displayed on a portal page via the financial management platform. A payer may more likely choose one payment method over another payment method to proceed with the invoice payment. For example, the order of the default payment methods presented on a payment screen may be associated with the probabilities of each method the payer may use to pay the related invoice.

Figure 3A:
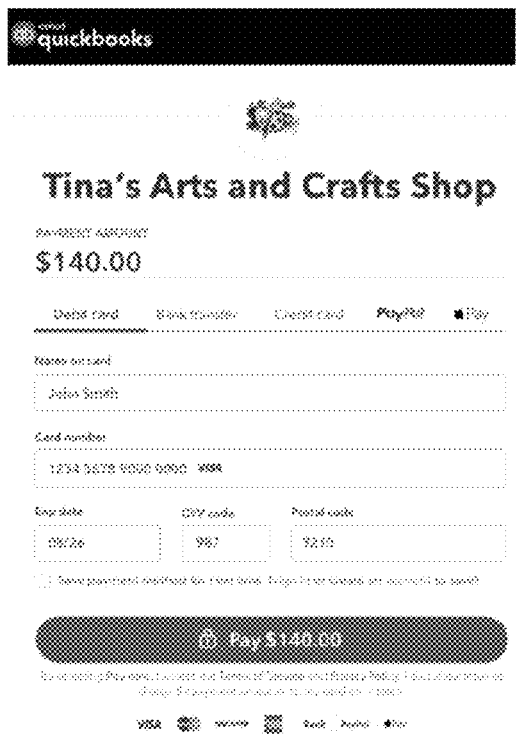
FIG. 3A-3D are example screenshots of payment screens associated with an example financial transaction in accordance with some embodiments of the present disclosure.

FIG. 3A illustrated an example screenshot of a payment screen displayed on a user interface of a computing device in accordance with some embodiments of the present disclosure. As illustrated, the displayed payment screen of FIG. 3A shows default payment methods in an order of "Debit card," "Bank transfer," "Credit card," "PayPal," and "Apply pay". A payer may more likely choose "Debit card" or "Bank transfer" to proceed with the payment.

Figure 3B:
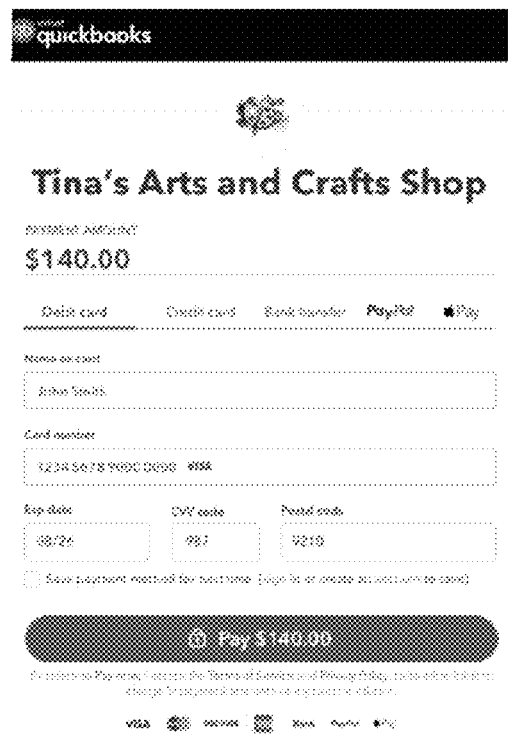

FIG. 3B is an example screenshot of a payment screen displayed on a user interface of a computing device in accordance with some embodiments. As illustrated, the example payment screen of FIG. 3B shows default payment methods in an order of "Debit card," "Credit card," "Bank transfer," "PayPal," and "Apply pay". A payer may more likely choose "Debit card" or "Credit card" to proceed with the payment.

Figure 3C:
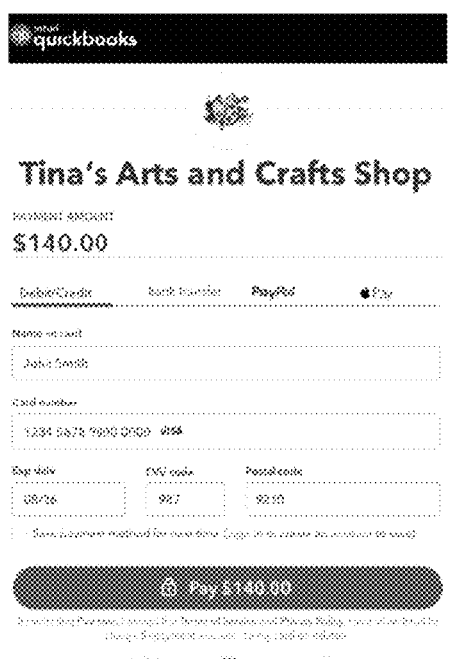

FIG. 3C is an example screenshot of a payment screen displayed on a user interface of a computing device in accordance with some embodiments. As illustrated, the displayed payment screen of FIG. 3C shows default payment methods in an order of "Debit/Credit card," "Bank transfer," "PayPal," and "Apply pay". A payer may more likely choose "Debit/Credit card" or "Bank transfer" to proceed with the payment.

Figure 3D:
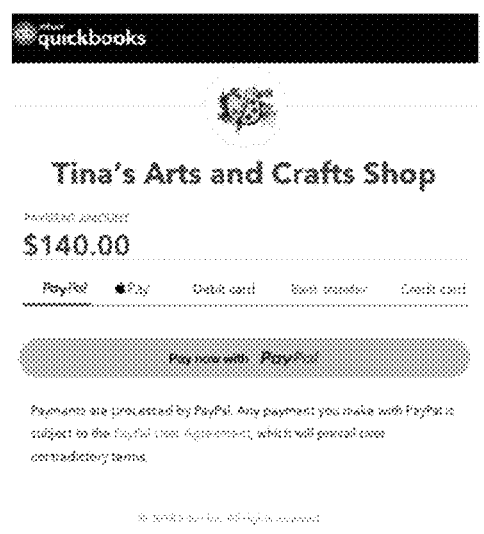

FIG. 3D is an example screenshot of a payment screen displayed on a user interface of a computing device in accordance with some embodiments. As illustrated, the displayed payment screen show default payment methods in an order of "PayPal," "Apply pay," "Debit card," "Bank transfer," and "Credit card". For example, a payer may more likely choose "PayPal" or "Apply pay" to proceed with the payment.

In some embodiments, a multivariate behavioral test may be conducted to obtain and accumulate the transaction data 127 through a service provider's financial management platform (e.g., Intuit QuickBooks Counterpart Portal) during a certain time period (e.g., every 2 months). For example, a plurality of different payment screens may be randomly distributed for about 400,000 invoices and presented to corresponding payers. Each payment screen of an invoice may include all payment screen options.

Figure 4:
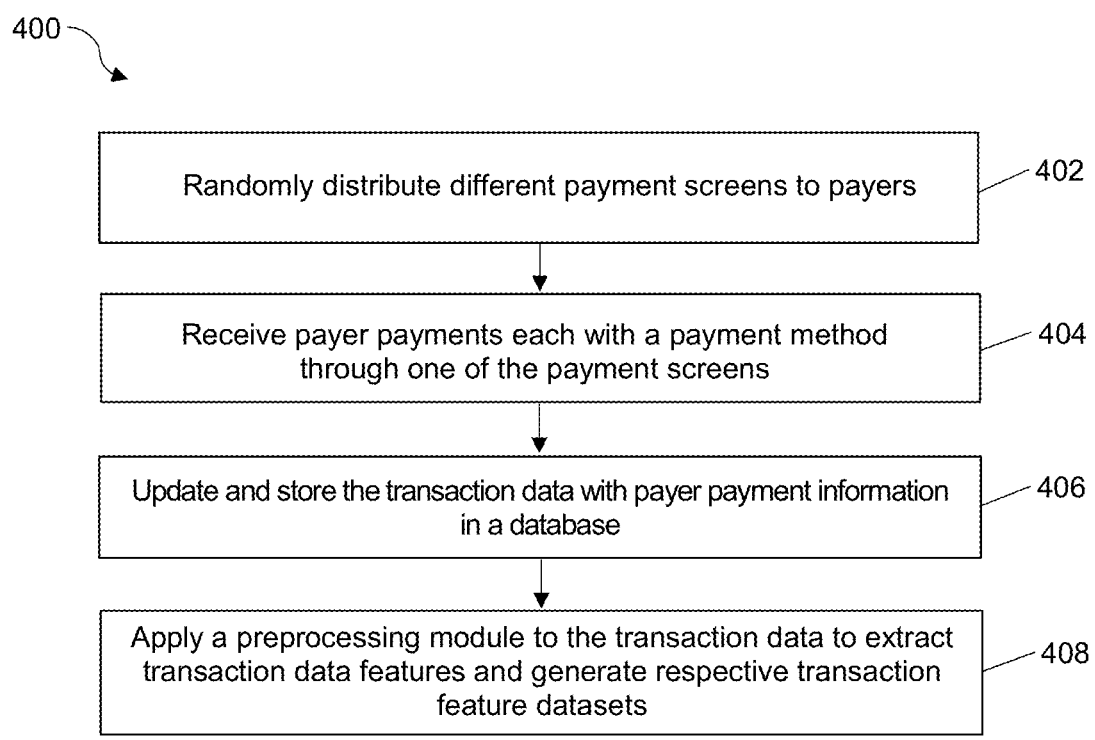
FIG. 4 is a flowchart illustrating an example process configured to perform a multivariate behavioral test in accordance with some embodiments of the present disclosure.

FIG. 4 is a flowchart illustrating an example process 400 configured to perform a multivariate behavioral test in accordance with some embodiments of the present disclosure. The process 400 may be configured as computer programs (e.g., applications 123) executed on one or more computing devices, in which the systems, model components, processes, and embodiments described in the present disclosure can be implemented. Thus, the described operations may be performed with computer-executable instructions under control of one or more processors. The order in which the operations are described is not intended to be construed as a limitation, and any number of the described operations can be combined in any order and/or in parallel to implement the process.

At step 402, application server 120 may randomly distribute a plurality of different payment screens, each associated with an electronic invoice, to a payer in response to payee's requests for generating invoices. Each payment screen may be configured to include a group of ordered payment methods arranged on a user interface 142 of a computing device 140 associated with a payer. A payer may receive an invoice via an email and make a payment via respective payment screen by choosing a default payment method based on the payer personal preference.

At step 404, application server 120 may receive payer payments, each with a payment method through one of the payment screens. The payer may choose a particular payment method from a payment screen based on their own preferences.

At step 406, application server 120 may update and store the transaction data with the selected payment method and other related payment information in the database 125.

Figure 5:
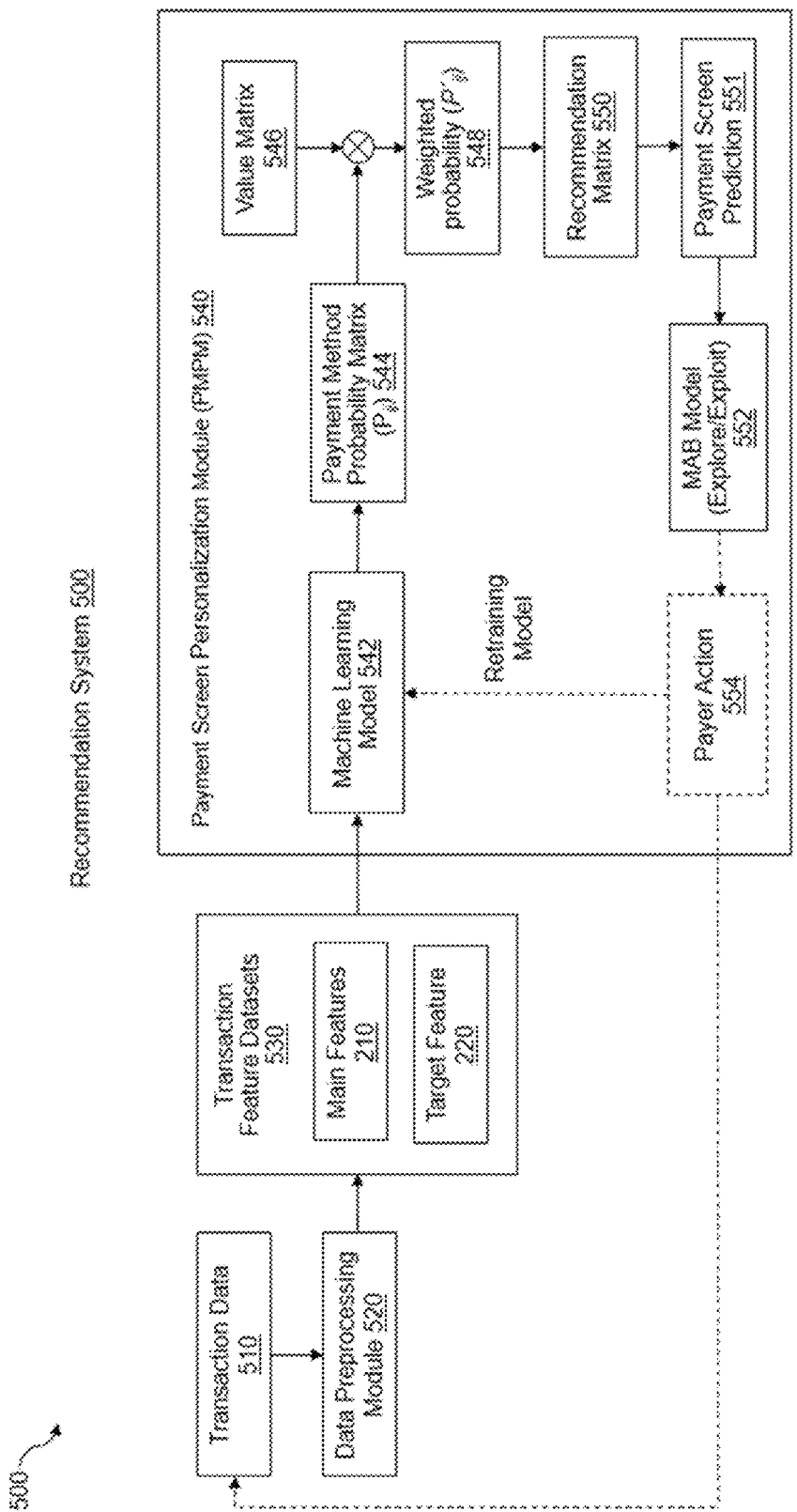
FIG. 5 is a conceptual diagram of an example recommendation system for generating the payment screen prediction recommendation in accordance with some embodiments of the present disclosure.

At step 408, application server 120 may be configured to cause a data preprocessing model 520 to perform preprocessing operations upon to the transaction data 510 to extract and construct a plurality sets of transaction data features from updated transaction data, as illustrated in FIG. 5. The plurality sets of data features may be constructed to generate respective transaction feature datasets 530 associated with respective invoices and payments.

FIG. 5 is a conceptual diagram of an example recommendation system 500 for generating a prediction of a payment screen in accordance with some embodiments of the present disclosure. The recommendation system 500 may be integrated into a financial management platform (e.g., Intuit QuickBooks Counterpart Portal) to facilitate generating electronic invoices in response to requests from payees. For example, application server 120 may execute recommendation system 500 of FIG. 5 or recommendation system 124 of FIG. 1 to predict personalized recommendation with a particular payment screen presented to the respective payers. In some embodiments, system 500 may include one or more machine learning algorithms which are configured as computer programs (e.g., software) executed on one or more computing devices, in which the systems, model components, processes, and embodiments can be implemented as described below.

Recommendation system 500 may include a data preprocessing model 520, and a payment screen personalization module 540. The payment screen personalization module 540 may include machine learning model 542 and a Multi-Armed Bandit (MAB) machine learning model 552. Data preprocessing model 520 may be configured to extract and construct transaction feature datasets 530 from transaction data 510. The transaction feature datasets 530 include invoice and payer payment behavior information which may be used to train a machine learning model 542 to produce probabilities of different payment methods and further make personalized payment screen predictions 551 presented to payers.

System 500 may include a Multi-Armed Bandit (MAB) machine learning model 552 or algorithm configured to explore or continuously exploit personalized payment screens in iterative processes. Details related to the MAB algorithm will be described in FIG. 9 below.

Application server 120 may continuously accumulate new transaction data and learn new choices of the payer action 554 with regard to payment methods and payment screens. The machine learning model 542 may be retrained based on the prediction results related to probabilities of payment methods and corresponding payment screens.

Figure 6:
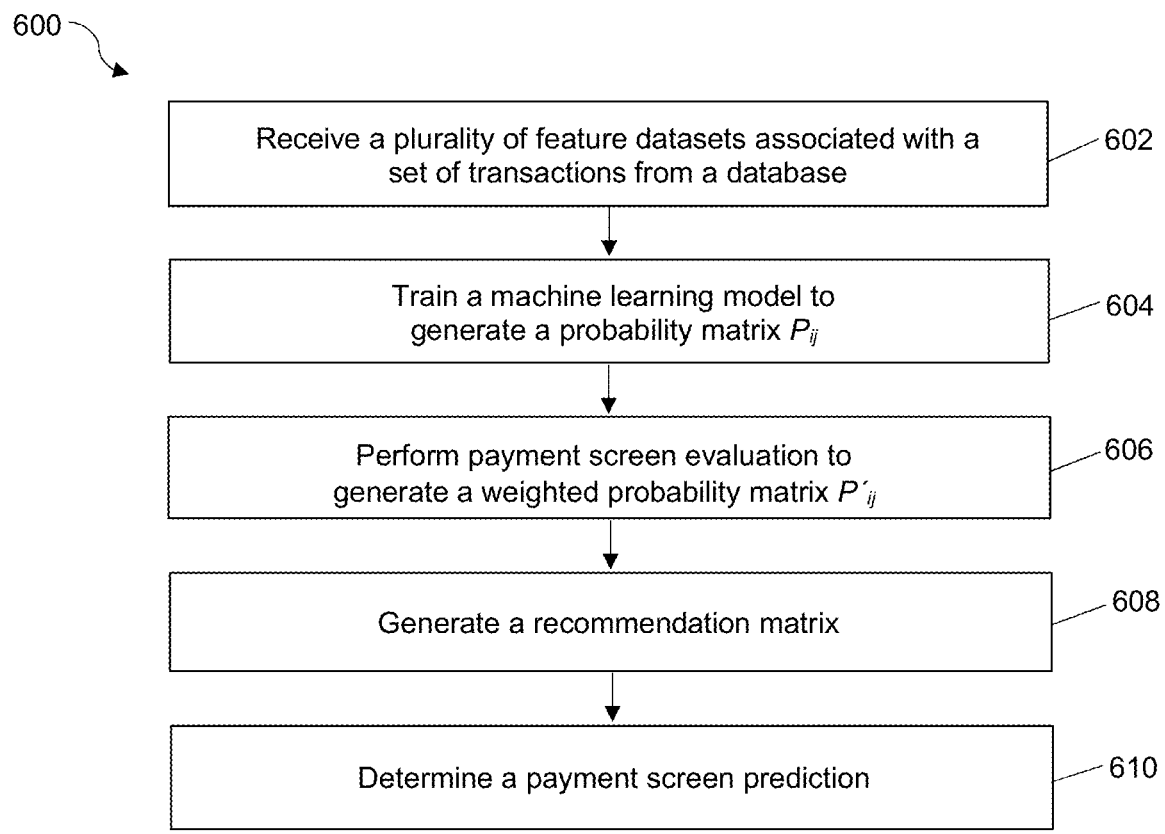
FIG. 6 is a flowchart illustrating an example process configured to train a machine learning model to predict payment method probabilities and generate payment screen prediction in accordance with some embodiments of the present disclosure.

FIG. 6 is a flowchart illustrating an example process 600 configured to train a machine learning model 542, predict payment method probabilities and generate the prediction of the payment screen in accordance with some embodiments of the present disclosure. The process 600 may be configured as computer programs (e.g., applications 123) executed on one or more computing devices, in which the systems, model components, processes, and embodiments described in the present disclosure can be implemented. Thus, the described operations may be performed with computer-executable instructions under control of one or more processors. The order in which the operations are described is not intended to be construed as a limitation, and any number of the described operations can be combined in any order and/or in parallel to implement the process.

At step 602, application server 120 may obtain/receive a plurality of feature datasets associated with a set of transaction data 510 from a database 125. Each feature dataset 530 associated with respective electronic transaction and invoice may include at least a group of independent features, a payment screen and a payment method. The payment method may be selected by a payer from a list of ordered payment methods presented on one of a plurality types of payment screens.

Figure 7:
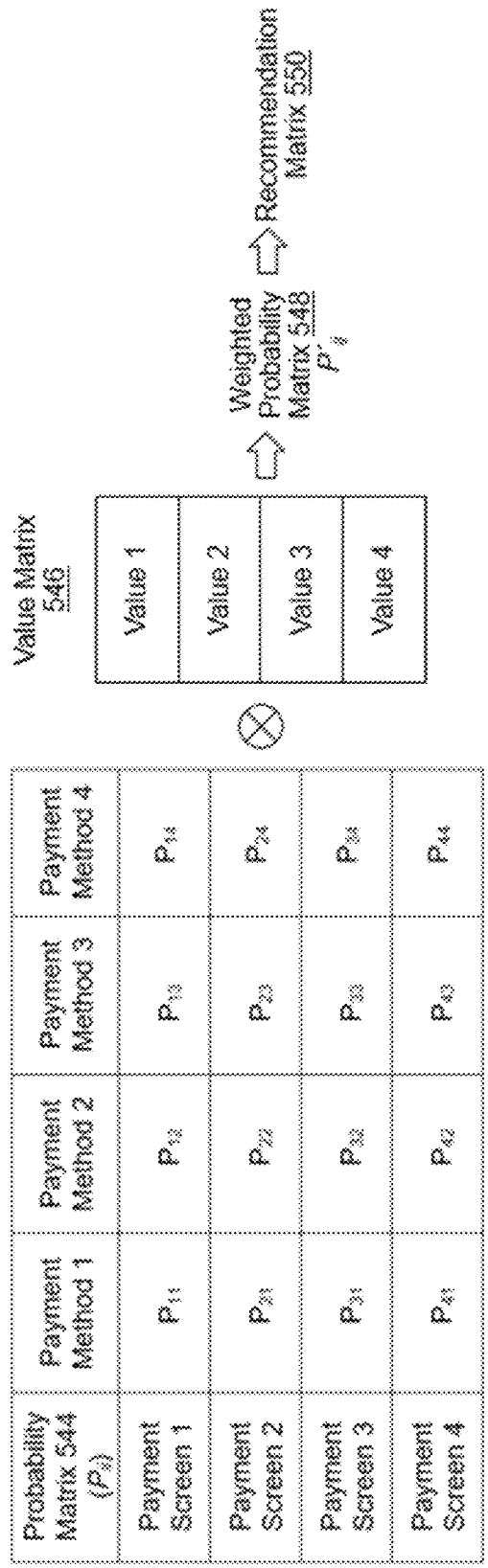
FIG. 7 is an example diagram configured to perform a payment screen evaluation in accordance with some embodiments of the present disclosure.

At step 604, a machine learning model 542 may be trained to generate a probability matrix $P_{ij}$ 544 as shown in FIG. 7. FIG. 7 is an example diagram configured to perform a payment screen evaluation with probability matrix $P_{ij}$ 544 in accordance with some embodiments of the present disclosure. In some embodiments, the machine learning model 542 is a Gradient Boosting Decision Tree (GBDT) model. The transaction feature datasets 530 may be fitted into the GBDT model. The gradient boosting decision tree (GBDT) model 542 may be trained to implement a supervised machine learning algorithm to process a plurality of transaction feature datasets 530 and produce probabilities of a set of payment methods that invoices may be paid, given the different screens presented to the payees. In some embodiments, the machine learning model 542 may be trained to determine the probability matrix $P_{ij}$ 544 related to 4 different payment screens. The payment screens may include a list of default payment methods such as "ACH," "Credit card/Paypal," "Debit Card," "Bank transfer," etc. The probability matrix $P_{ij}$ 544 may include data indicative of different payment screens and data indicative of different payment methods. Each probability score of the probability matrix may be indicative of a probability that each payment method presented on corresponding payment screens is used for paying respective invoices. For example, the rows (i) of the probability matrix $P_{ij}$ 544 may correspond to a set of payment screens randomly distributed to the payers. The columns (j) of the probability matrix 544 may correspond to a set of default payment methods that the payers choose to make payments via respective payment screens. Each element of the probability matrix $P_{ij}$ 544 may represent a probability that each payment method presented on corresponding payment screens is used for paying respective invoices.

At step 606, application server 120 may perform a payment screen evaluation by applying different weights to each probability score of the probability matrix $P_{ij}$ 544 to generate a weighted probability matrix $P'_{ij}$ 548. In one embodiment as illustrated in FIG. 7, application server 120 may generate the weighted probability matrix $P'_{ij}$ 548 by applying a value matrix 546 to weigh a probability value of each element of the probability matrix $P_{ij}$ 544. For example, the elements of weighted probability matrix $P'_{ij}$ 548 may be obtained by multiplying the probability matrix $P_{ij}$ 544 by the value matrix 546.

In some embodiments, different weights or the value matrix 546 may be established by a service provider based on certain criteria, rules and/or algorithms in terms of service provider's revenue and customer satisfaction for maximizing payer payments from the payers and increasing revenue of the service provider. The value matrix 546 may facilitate the decision-making process to predict personalized payment screen from the sets of the payment screens. For example, the value matrix 546 may be preconfigured as a value vector representing the various weighted values of a list of payment methods for evaluating a set of payment screens against a set of payment methods. Each preconfigured weigh may be associated with a payment method for increasing invoice payments and maximizing interchange rates of the invoice payments. In one embodiment, value matrix 546 may be a preconfigured vector with 4 values (Value 1-Value 4) or 4 weights. For example, the debit card payment method may get a higher weight compared to the bank transfer payment method. The recommendation system 500 may be configured to generate weighted probability scores of all elements of probability matrix $P_{ij}$ 544 for 4 different payment methods in correlation with the preconfigured value matrix 546, and thereby to maximize the performance of relationships between a sets of payment screens and a set of payment methods.

At step 608, application server 120 may generate a recommendation matrix R 550 based on values of the weighted probability matrix $P'_{ij}$ 548. Based on the step 606, the values of the weighted probability matrix $P'_{ij}$ 548 may include weighted probability scores of each row of the probability matrix. In one embodiment as illustrated in FIG. 7, each element or value of the recommendation matrix R may be determined to be a sum of values of each row of the weighted probability matrix $P'_{ij}$ 548. Each row of the weighted probability matrix $P'_{ij}$ 548 corresponds to each payment screen. Each value of recommendation matrix R or a sum of weighted probability scores of each row of the weighted probability matrix $P'_{ij}$ 548 may be indicated as an expected gain, given the different payment method probabilities and their weights.

At step 610, application server 120 may determine a payment screen prediction 551 or generate a model recommendation based on weighted probability matrix $P'_{ij}$ and values of the recommendation matrix R. In one embodiment, the payment screen prediction 551 may be determined to be the payment screen which corresponds to the maximum value in the recommendation matrix R. The payment screen prediction 551 may be represented as a prediction of a payment screen which includes one or more predicted and ordered payment methods. In one embodiment, the one or more predicted payment methods may be displayed on the predicated payment screen and be arranged based on the corresponding weighted probabilities of the weighted probability matrix $P'_{ij}$ 548.

In some embodiments, application server 120 may determine whether the maximum value is below a predetermined threshold. In response to determining that the maximum value is below a predetermined threshold, application server 120 may execute process 400 to retrieve new transaction data from the database 125 and generate a new set of transaction feature datasets. The process 600 may be executed to retrain the machine learning model 542 with the new set of transaction feature datasets.

Figure 8A:
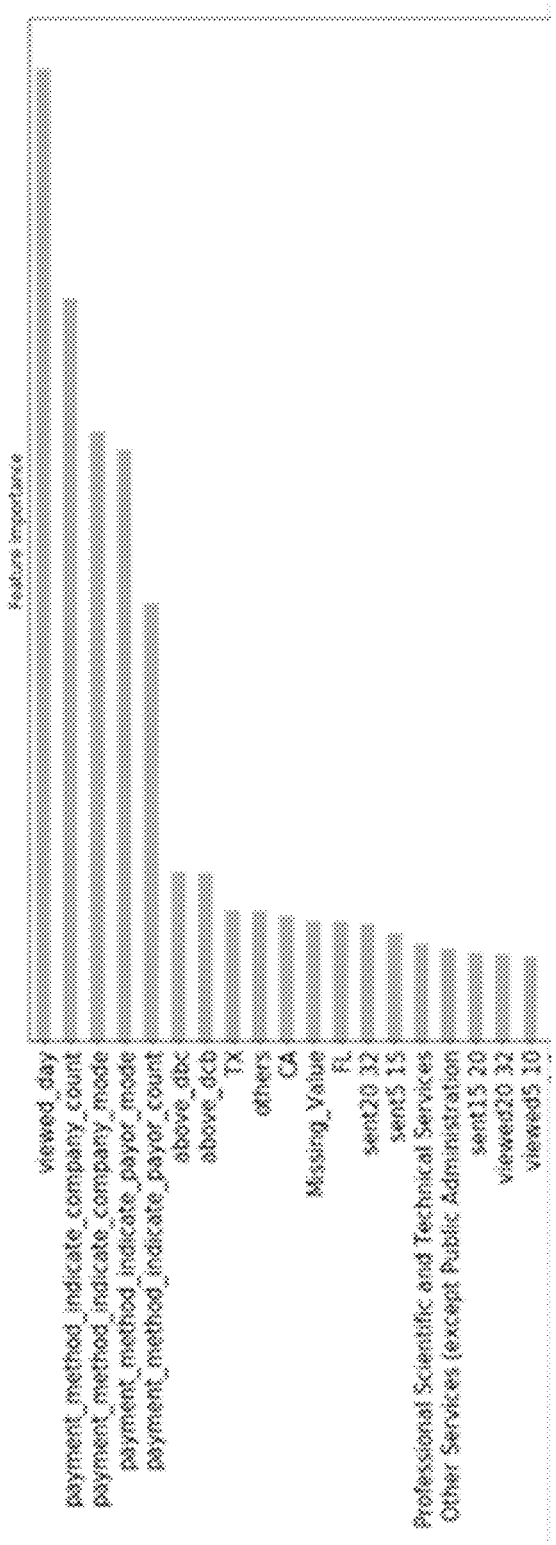
FIG. 8A illustrates example feature importance scores in accordance with some embodiments of the present disclosure.

In one or more embodiments, during the processes of training and retraining the machine learning model 542, not all features of the transaction feature datasets 200 equally influence the predicted payment screen to be provided to a payer. FIG. 8A illustrates example feature importance scores of some transaction features in accordance with some embodiments of the present disclosure. FIG. 8B illustrates a list of example transaction features that may be used for the machine learning model training and that may correspond to the feature importance scores in FIG. 8A in some embodiments.

As illustrated in FIG. 8A, the importance of a plurality of example features may be ranked in a descending order of the corresponding feature importance scores (as shown by the size of the corresponding graphical bar). For example, a feature of "viewed_day" may be one of the invoice features 214 and indicative of a day of the week when an invoice was viewed by the payer (e.g., a payor) user. A feature of "payment_method_indicate_company_count" may be one of the payee entity features 212 and may be indicative of a number of times of the most frequent payment method used for a merchant. A feature of "payment_method_indicate_company_mode" may be one of the payee entity features 212 and may be indicative of the most frequent payment method for a merchant. A feature of "payment_method_indicate_payor_mode" may be one of the payer entity features 216 and may be indicative of the most frequent payment method for a payer. A feature of "payment_method_indicate_payor_count" may be one of the payer entity features 216 and may be indicative of a number of times that the most frequent payment method used by a payor. These example features or attributes may be continually updated, due to the retraining of the machine learning model retraining, to include the features most importantly associated with the preferred payment method. Using features based on the feature importance for the machine learning model retraining may further improve the machine learning model retraining efficiency and accuracy.

In some embodiments, application server 120 may determine whether to exploit the payment screen prediction based on a trained machine learning model 542 or to explore a new different alternative screen to retrain the model 542 based on new action choices of the payees. System 500 may include a Multi-Armed Bandit (MAB) machine learning model 552 or algorithm configured to explore or continuously exploit personalized payment screens in iterative processes. The MAB algorithm 552 may utilize a reinforcement learning strategy to automate a payment screen personalization process by exemplifying the exploration-exploitation tradeoff to find optimal payment screens for user transactions associated with payers and payees.

Figure 9:
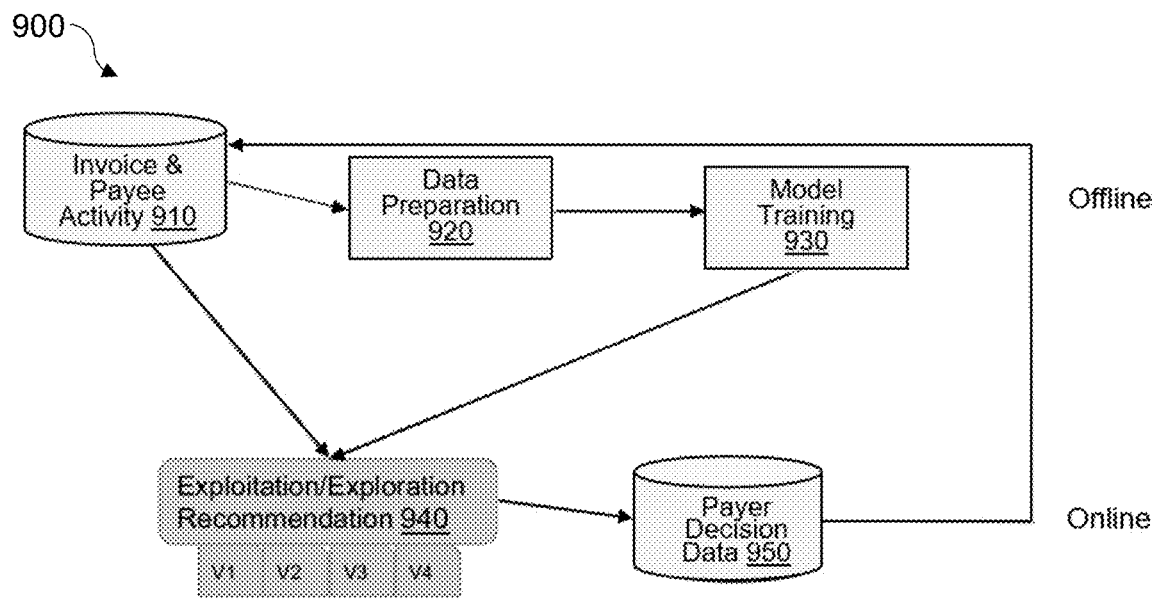
FIG. 9 is an example framework configured to conduct exploration/exploitation processes to generate personalized payment screen prediction in accordance with some embodiments of the present disclosure.

FIG. 9 is an example framework 900 configured to conduct exploration/exploitation processes simultaneously to generate a prediction of a personalized payment screen based on user actions in iterative processes in accordance with some embodiments of the present disclosure. Framework 900 may further maximize the revenue for the service provider along with customer satisfaction according to the described machine learning model training and exploration-exploitation approach. Framework 900 may be utilized to obtain optimized payment screens for associated invoice transactions while maximizing payer payments via portal pages of the service provider's financial management platform. Application server 120 may continuously generate new transaction data and electronic invoices based on payee activities and obtain new decision data 950 of the payers with regard to payment methods and payment screens.

For example, 80% of the invoice transactions may be used for an exploitation process based on a trained machine learning model 542 and 20% of the invoice transactions may be used for implementing exploration processes to retrain the machine learning model 542 according processes 400, 500 and 600.

In some embodiments, framework 900 may be utilized to conduct an offline exploration process to retrieve invoice and payee activity (from storage 910), construct new transaction feature datasets (via Data preparation block 920) with target features from payer decision data (from storage 950) and retrain the machine learning model (via Model training block 930) according to process 600. Within the exploration processes, application server 120 may retrain the machine learning model with different sets of transaction data and different payment screen templates. For example, different payment screens may be randomly distributed for use with 20% of the transactions during a time period for accumulating invoice transaction training data. A transaction feature dataset may include new features from a redesigned metric such as payer computing device, payer location data, etc. As illustrated in FIG. 2A and FIG. 9, the payment screens distributed to different invoices may be represented as 4 example payment screens V1-V4 (at block 940). For example, the probabilities of different payment screens used for training a machine learning model (via Model training block 930) during an exploitation process may be defined to be 50% for Paypal payment screen (V4) and 50% equally for other payment screens V1-V3.

Figure 10:
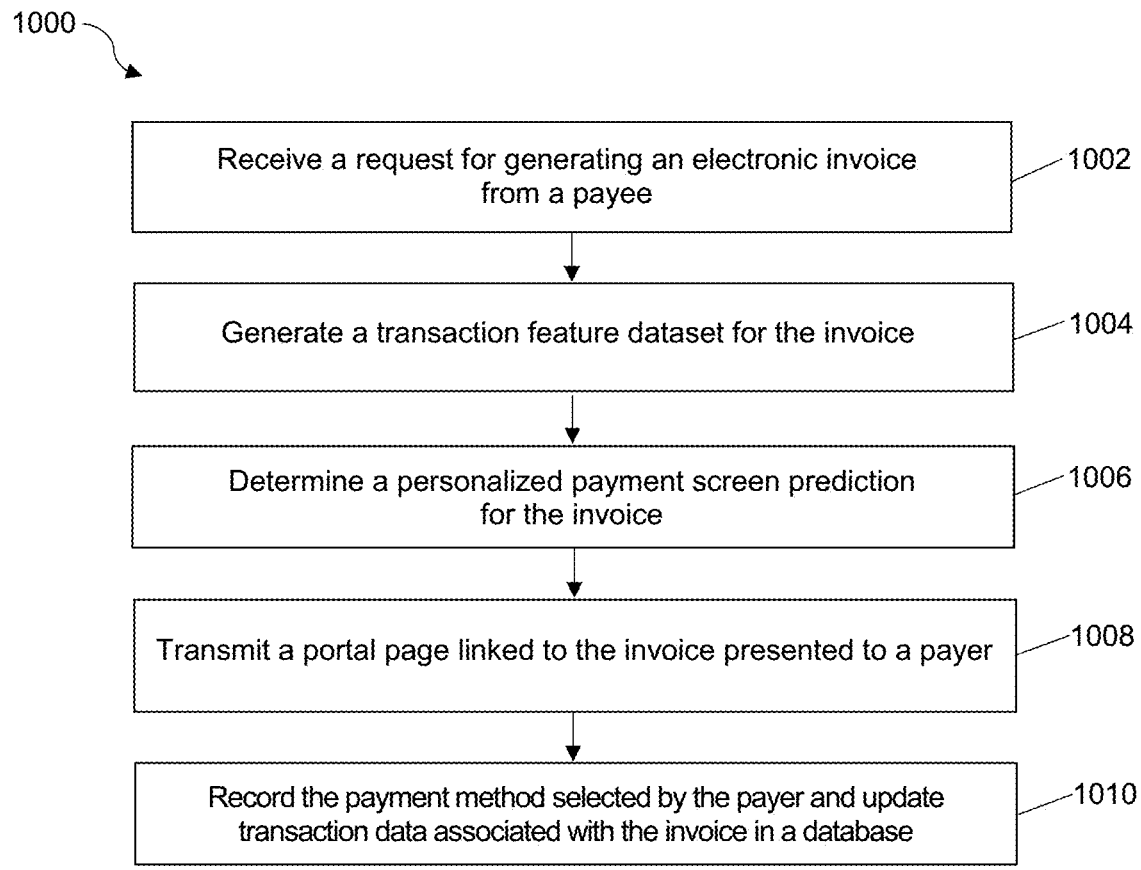
FIG. 10 is a flowchart illustrating an example exploitation process to generate personalized payment screen prediction in accordance with some embodiments of the present disclosure.

In some embodiments, framework 900 may be utilized to conduct an online exploitation process based a trained machine learning model 542. FIG. 10 is a flowchart illustrating an example exploitation process 1000 to generate personalized payment screen predictions in accordance with some embodiments of the present disclosure. The process 1000 may be configured as computer programs (e.g., applications 123) executed on one or more computing devices, in which the systems, model components, processes, and embodiments described in the present disclosure can be implemented. Thus, the described operations may be performed with computer-executable instructions under the control of one or more processors. The order in which the operations are described is not intended to be construed as a limitation, and any number of the described operations can be combined in any order and/or in parallel to implement the process.

At step 1002, application server 120 may obtain a plurality of requests from a plurality of computing devices 130 associated with payees through the platform over the network. The plurality of requests may be initiated by the payees to generate new electronic invoices with new transaction data for respective transactions associated with payers via the financial management platform (e.g., QuickBooks Online®). In one embodiment, a payee or merchant may input and/or upload transaction related data associated with an invoice via a computing device 130 into the financial service provider's financial management platform (e.g., QuickBooks™ online application) which may generate a corresponding electronic invoice (Invoice & payee activity 910).

At step 1004, application server 120 may apply a data preprocessing model 520 to transaction data to construct or generate corresponding transaction feature dataset 530 for each invoice transaction (Data preparation block 920).

At step 1006, based on a trained machine learning model 542 and a value matrix 546, application server 120 may generate a weighted probability matrix $P'_{ij}$ 548 and a recommendation matrix R to determine a prediction of a personalized payment screen. The prediction of the personalized payment screen may include one or more predicted payment methods arranged based on the corresponding weighted probabilities of $P'_{ij}$ 548, as described in FIG. 6 and process 600.

At step 1008, application server 120 may transmit a portal page link associated with the invoice with a prediction of the respective payment screen to respective computing device 140 operated by the payer and present a personalized payment screen to the payer on as a user interface of the computing device 140 over the network. For examples, application server 120 may generate an invoice with a prediction of a personalized payment screen along with a list of ordered payment methods. The personalized recommendation of a payment screen with predicted payment methods may be presented as a portal page associated with the financial management platform and displayed on the user interface of the computing device 140 associated with the payer. The generated invoice may be sent to a payer as an email with a linked portal page through the financial management platform. The payer may access the invoice via the related portal page, select one payment method presented on the payment screen and submit an invoice payment to the platform by application server 120. Application server 120 may receive payment information including payer decision data 950 and the corresponding payment for respective invoice. The payer decision data 950 may include the payment method selected by the payer for the invoice. The selected payment method is represented as a target variable or feature 222 of the transaction feature dataset 200 of the invoice.

At step 1010, upon receiving the payment from the payer, application server 120 may record the payment method selected by the payer and update the target variable 222 (e.g., payer decision data 950) of transaction feature dataset 200 and other payment information associated with the corresponding invoice and transaction data 510 stored in a database 125.

In some embodiments, a trained machine learning model 542 described in process 600 and process 1000 may be validated and deployed into a practical application in a server-client computing environment of system 100. For example, the trained machine learning model 542 may be deployed into one of the components of the applications 123 to provide payment services to payees and related payers through the financial management platform. The trained machine learning model 542 may be integrated with the platform (e.g., QuickBooks™ online application) to determine the personalized payment screen with predicted payment methods to be displayed on a user interface of a computing device 140 when a payer is interacting with the financial management platform or the online product over the network 110.

As described, process 1000 establishes a practical machine learning based application to maximize payer payments via portal pages of the service provider's financial management platform and thereby to maximize the profits and increase revenues for the service provider along with customer satisfaction.

Figure 11:
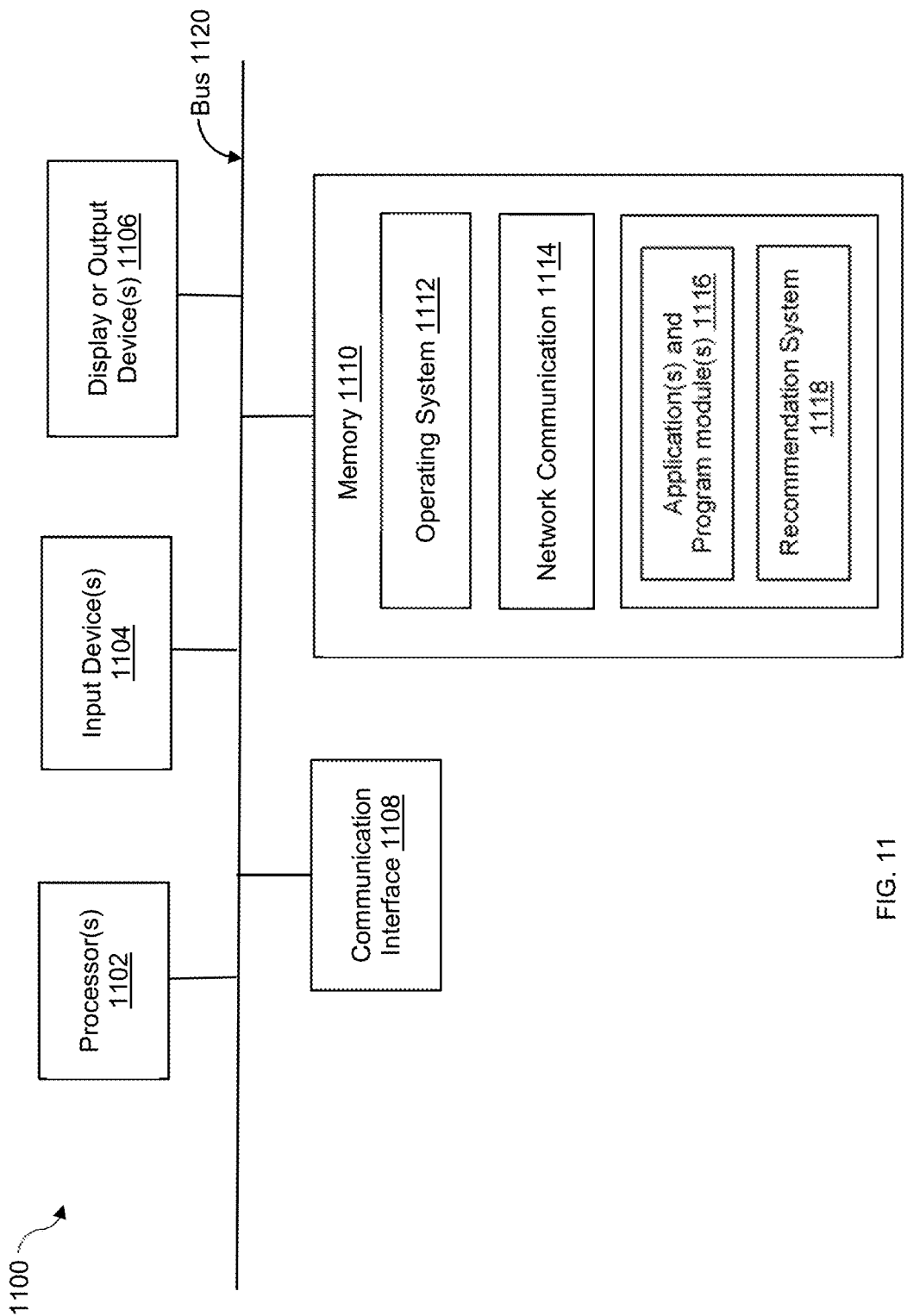
FIG. 11 is a block diagram of an example computing device in accordance with some embodiments of the present disclosure.

FIG. 11 is a block diagram of an example computing device 1100 that may be utilized to execute embodiments to implement processes including various features and functional operations as described herein. For example, computing device 1100 may function as application server 120, computing devices 130 and computing devices 140 or a portion or combination thereof in some embodiments. The computing device 1100 may be implemented on any electronic device to execute software applications derived from program instructions for recommendation system 124 of FIG. 1, recommendation system 500 of FIG. 5 or recommendation system 1118 of FIG. 11. The computing device 1100 may include but is not limited to personal computers, servers, smart phones, media players, electronic tablets, game consoles, mobile devices, email devices, etc. In some implementations, the computing device 1100 may include one or more processors 1102, one or more input devices 1104, one or more display or output devices 1106, one or more communication interfaces 1108, and memory 1110. Each of these components may be coupled by bus 1120, or in the case of distributed computer systems, one or more of these components may be located remotely and accessed via a network.

Processor(s) 1102 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more non-transitory computer-readable storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input device 1104 may be any known input device technology, including but not limited to a keyboard (including a virtual keyboard), mouse, track ball, and touch-sensitive pad or display. To provide for interaction with a user, the features and functional operations described in the disclosed embodiments may be implemented on a computer having a display device 1106 such as a CRT (cathode ray tube) or LCD (liquid crystal display) monitor for displaying information to the user and a keyboard and a pointing device such as a mouse or a trackball by which the user can provide input to the computer. Display device 1106 may be any known display technology, including but not limited to display devices using Liquid Crystal Display (LCD) or Light Emitting Diode (LED) technology.

Communication interfaces 1108 may be configured to enable computing device 1100 to communicate with other computing or network device across a network, such as via a wired connection, a wireless connection, or a combination of wired and wireless connections. For example, communication interfaces 1108 may include an Ethernet interface, an optical interface, a coaxial interface, an infrared interface, a radio frequency (RF) interface, a universal serial bus (USB) interface, a Wi-Fi interface, a cellular network interface, or the like.

Memory 1110 may be any computer-readable medium that participates in providing computer program instructions and data to processor(s) 1102 for execution, including without limitation, non-volatile storage media (e.g., optical disks, magnetic disks, flash drives, etc.), or volatile storage media (e.g., SDRAM, ROM, etc.). Memory 1110 may include various non-transitory computer-readable instructions for implementing an operating system 1112 (e.g., Mac OS®, Windows®, Linux), network communication 1114, and Application(s) and program modules 1116, etc. one program module may be a recommendation system 1118. The operating system may be multi-user, multiprocessing, multitasking, multithreading, real-time, and the like. The operating system may perform basic tasks, including but not limited to: recognizing input from input device 1104; sending output to display device 1106; keeping track of files and directories on memory 1110; controlling peripheral devices (e.g., disk drives, printers, etc.) which can be controlled directly or through an I/O controller; and managing traffic on bus 1120. Bus 1120 may be any known internal or external bus technology, including but not limited to ISA, EISA, PCI, PCI Express, NuBus, USB, Serial ATA or FireWire.

Network communications instructions 1114 may establish and maintain network connections (e.g., software applications for implementing communication protocols, such as TCP/IP, HTTP, Ethernet, telephony, etc.).

Application(s) and program modules 1116 may include software application(s) and different functional program modules which are executed by processor(s) 1102 to implement the processes described herein and/or other processes. The program modules may include but not limited to software programs, objects, components, data structures that are configured to perform particular tasks or implement particular data types. The processes described herein may also be implemented in operating system 1112.

Communication between various network and computing devices may be facilitated by one or more application programming interfaces (APIs). APIs of system 1100 may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and application servers. A user or client computing device and server may generally be remote from each other and may typically interact through a network. The relationship of client computing devices and server may arise by virtue of computer programs running on the respective computers and having a client-server relationship to each other.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method implemented by a computing system, the computing system comprising one or more processors and one or more non-transitory computer-readable storage devices having computer-executable computer instructions which, when executed by the one or more processors, cause the one or more processors to perform operations comprising:

obtaining, from a database, a plurality of feature datasets associated with transaction data of a plurality of electronic invoices, each feature dataset being associated with a respective electronic invoice sent by a device of a payee entity to a device of a payer entity over a network, each feature dataset comprising a payment screen of a plurality of payment screens and a payment method of a plurality of payment methods that are each configured to be presented for selection on at least one of the plurality of payment screens;

training a machine learning model with the plurality of feature datasets;

generating, using the machine learning model, a probability matrix comprising a plurality of probability scores, each probability score being indicative of a probability that each of the respective payment methods presented on each of the respective payment screens is used for paying respective electronic invoices;

generating, based on weighing each probability score of the probability matrix, a recommendation matrix comprising respective weighted probability scores; and determining a prediction of a payment screen based on the recommendation matrix.

2. The method of claim 1, wherein weighing each probability score comprises applying a value matrix to each probability score to obtain respective weighted probability scores, and wherein each element of the recommendation matrix is a sum of weighted probability scores of the respective payment methods of each of the respective payment screens.

3. The method of claim 2, wherein the value matrix comprises a preconfigured vector of weights corresponding to the plurality of payment methods.

4. The method of claim 1, wherein the prediction of the payment screen is determined to be the payment screen associated with a maximum sum in the recommendation matrix.

5. The method of claim 4, wherein the operations performed by the one or more processors further comprise:
   determining whether the maximum sum is below a predetermined threshold; and
   in response to determining that the maximum sum is below the predetermined threshold, retraining the machine learning model.

6. The method of claim 1, wherein each feature dataset associated with each respective electronic invoice comprises a plurality of features comprising payee entity data, invoice data, payer entity data, a payment screen, and a payment method used for the respective electronic invoice, each payment screen comprising the plurality of payment methods configured to be displayed in a respective different order, and wherein training the machine learning model with the plurality of feature datasets comprises training a Gradient Boosting Decision Tree (GBDT) model with the plurality of feature datasets.

7. The method of claim 3, wherein the operations performed by the one or more processors further comprise:
   receiving, from a device of a payee entity over a network, a request to generate a new electronic invoice for a payer entity; and
   in response to the request, determining, based on the trained machine learning model and the value matrix, a prediction of a personalized payment screen including a plurality of payment methods.

8. The method of claim 7, wherein the operations performed by the one or more processors further comprise:
   providing, over the network, a link to a page of the personalized payment screen to the payer entity that when selected presents the personalized payment screen on the device of the payer entity.

9. The method of claim 7, wherein the personalized payment screen is presented as a graphical user interface with the plurality of the payment methods displayed in a respective order.

10. The method of claim 1, wherein the operations performed by the one or more processors further comprise:
    conducting a multivariate behavioral test to obtain transaction data of a plurality of electronic invoices, the multivariate behavioral test comprising:
    randomly selecting and presenting one of the plurality of the payment screens on a user interface of each respective device of a plurality of payer entities;
    receiving respective payments from respective payer entities with respective payment methods presented on the respective payment screens;
    storing information of the respective payments as the transaction data of the plurality of electronic invoices in the database; and
    extracting the plurality of data features of each transaction from the transaction data to generate each feature dataset for each transaction.

11. A computing system, comprising:
    one or more processors; and
    one or more non-transitory computer-readable storage devices storing computer-executable instructions, the instructions operable to cause the one or more processors to perform operations comprising:
    obtaining, from a database, a plurality of feature datasets associated with transaction data of a plurality of electronic invoices, each feature dataset being associated with a respective electronic invoice sent by a device of a payee entity to a device of a payer entity over a network, each feature dataset comprising a payment screen of a plurality of payment screens and a payment method of a plurality of payment methods that are each configured to be presented for selection on at least one of the plurality of payment screens;
    training a machine learning model with the plurality of feature datasets;
    generating, using the machine learning model, a probability matrix comprising a plurality of probability scores, each probability score being indicative of a probability that each of the respective payment methods presented on each of the respective payment screens is used for paying respective electronic invoices;
    generating, based on weighing each probability score of the probability matrix, a recommendation matrix comprising respective weighted probability scores; and
    determining a prediction of a payment screen based on the recommendation matrix.

12. The system of claim 11, wherein weighing each probability score comprises applying a value matrix to each probability score to obtain respective weighted probability scores, and wherein each element of the recommendation matrix is a sum of weighted probability scores of the respective payment methods of each of the respective payment screens.

13. The system of claim 12, wherein the value matrix comprises a preconfigured vector of weights corresponding to the plurality of payment methods.

14. The system of claim 11, wherein the prediction of the payment screen is determined to be the payment screen associated with a maximum sum in the recommendation matrix.

15. The system of claim 14, wherein the operations performed by the one or more processors further comprise:
    determining whether the maximum sum is below a predetermined threshold; and
    in response to determining that the maximum sum is below the predetermined threshold, retraining the machine learning model.

16. The system of claim 11, wherein each feature dataset associated with each respective electronic invoice comprises a plurality of features comprising payee entity data, invoice data, payer entity data, a payment screen, and a payment method used for the respective electronic invoice, each payment screen comprising the plurality of payment methods configured to be displayed in a respective different order, and wherein training the machine learning model with the plurality of feature datasets comprises training a Gradient Boosting Decision Tree (GBDT) model with the plurality of feature datasets.

17. The system of claim 12, wherein the operations performed by the one or more processors further comprise:
    receiving, from a device of a payee entity over a network, a request to generate a new electronic invoice for a payer entity; and
    in response to the request, determining, based on the trained machine learning model and the value matrix, a prediction of a personalized payment screen including a plurality of payment methods.

18. The system of claim 17, wherein the operations performed by the one or more processors further comprise:
providing, over the network, a link to a page of the personalized payment screen to the payer entity that when selected presents the personalized payment screen on the device of the payer entity.

19. The system of claim 17, wherein the personalized payment screen is presented as a graphical user interface with the plurality of the payment methods displayed in a respective order.

20. The method of claim 11, wherein the operations performed by the one or more processors further comprise:
conducting a multivariate behavioral test to obtain transaction data of a plurality of electronic invoices, the multivariate behavioral test comprising:
randomly selecting and presenting one of the plurality of the payment screens on a user interface of each respective device of a plurality of payer entities;
receiving respective payments from respective payer entities with respective payment methods presented on the respective payment screens;
storing information of the respective payments as the transaction data of the plurality of electronic invoices in the database; and
extracting the plurality of data features of each transaction from the transaction data to generate each feature dataset for each transaction.

* * * * *